(12) United States Patent
Hamida et al.

(10) Patent No.: US 7,861,988 B2
(45) Date of Patent: Jan. 4, 2011

(54) HEAT EXCHANGER MOUNTING BRACKET

(75) Inventors: Jamil Ben Hamida, Foetz (LU);
Slawomir Kedziora, Sanem (LU);
Frank J. Leitch, North Tonawanda, NY (US); Brian J. Coyle, Orchard Park, NY (US); Robert C. Gmerek, Burt, NY (US)

(73) Assignee: Delphi Technologies, Inc., Troy, MI (US)

( * ) Notice: Subject to any disclaimer, the term of this patent is extended or adjusted under 35 U.S.C. 154(b) by 759 days.

(21) Appl. No.: 11/717,887

(22) Filed: Mar. 14, 2007

(65) Prior Publication Data

US 2007/0251669 A1 Nov. 1, 2007

(30) Foreign Application Priority Data

Apr. 26, 2006 (GB) ................................ 0608159.0

(51) Int. Cl.
*F24H 9/06* (2006.01)
(52) U.S. Cl. .................. 248/232; 180/68.4; 248/213.3
(58) Field of Classification Search ................ 248/232, 248/233, 234, 289.11, 288.11, 274.1, 213.4, 248/213.3; 180/68.4; 165/41, 42
See application file for complete search history.

(56) References Cited

U.S. PATENT DOCUMENTS

| | | | | |
|---|---|---|---|---|
| 5,067,574 | A | * | 11/1991 | Attinger et al. ............ 180/68.4 |
| 5,220,973 | A | * | 6/1993 | Murau et al. ............... 180/68.4 |
| 5,291,961 | A | * | 3/1994 | Attinger et al. ............ 180/68.4 |
| 6,412,581 | B2 | * | 7/2002 | Enomoto et al. ........... 180/68.4 |
| 7,370,690 | B2 | * | 5/2008 | Rasset et al. .................. 165/41 |
| 7,398,847 | B2 | * | 7/2008 | Schmitt ..................... 180/68.4 |

* cited by examiner

*Primary Examiner*—A. Joseph Wujciak, III
(74) *Attorney, Agent, or Firm*—Patrick M. Griffin

(57) ABSTRACT

The invention relates to a heat exchanger mounting bracket which has a first member with a retaining channel and a second member with a retaining lug. The retaining channel of the first member retains the retaining lug of the second member at an initial mounting position, with a predetermined retaining force, by way of at least a formation on the first member. The retaining channel and lug are releaseable from one another when a force greater than or equal to the predetermined retaining force is applied between the first and second members. A heat exchanger mounting bracket is also provided where a body member is provided with a longitudinal slot toward one end for locating a portion (P) of a heat exchanger, and a pivotal arrangement toward the other end. The pivotal arrangement and longitudinal slot allow displacement of the portion (P) of the heat exchanger from a fore to an aft position upon application of an impact force.

4 Claims, 5 Drawing Sheets

HEAT EXCHANGER MOUNTING BRACKET

TECHNICAL FIELD OF INVENTION

The present invention relates to a heat exchanger mounting bracket, particularly, a heat exchanger mounting bracket for mounting a heat exchanger in the engine compartment of a vehicle.

BACKGROUND OF INVENTION

Vehicles are typically provided with a heat exchanger toward the front of the engine compartment, often in the form of a Condenser Radiator Fan Module (CRFM). Such CRFMs are crucial to the operation of the vehicle. Due to the CRFM's inherent fragility and location it is often damaged in the event of a medium impact crash (where damage is caused but the vehicle is not destroyed) to the extent that it will no longer work and will not allow the vehicle to be driven away to a garage for example. This presents a major inconvenience to the driver.

Furthermore, safety regulations often require that certain portions of a vehicle deform by a sufficient amount in the event of an impact with particular objects in order to minimize damage to that object (for example a pedestrian).

SUMMARY OF THE INVENTION

According to a first aspect of the present invention, there is provided a heat exchanger mounting bracket having a first member having a retaining channel; a second member having a retaining lug, wherein the retaining channel of the first member is adapted to selectively retain the retaining lug of the second member at an initial mounting position, with a predetermined retaining force, by way of at least a formation on the first member, and to selectively release the retaining lug from that initial mounting position when a force greater than or equal to the predetermined retaining force is exerted between the first and second members.

Optionally, the first member has a recess at one end of the channel for locating a portion of a heat exchanger toward one end of the bracket and a second recess at the other end of the channel for selectively locating that portion of the heat exchanger toward the other end of the bracket, such that the channel allows displacement of the portion of the heat exchanger from the first recess to the second recess upon application of an impact force greater than or equal to the predetermined retaining force.

Preferably, the portion of the heat exchanger comprises a mounting pin.

Preferably, the first and second recesses are shaped to correspond to the cross sectional shape of the pin of the heat exchanger. More preferably, the first and second recesses are circular to correspond to a circular cross section of the pin of the heat exchanger.

Preferably, the channel comprises resilient walls spaced apart by a smaller distance than the diameter of the mounting pin of the heat exchanger. More preferably, the resiliency and spacing between the walls are adapted to ensure that the pin may only pass from the first recess to the second recess when a sufficient impact force is exerted on the pin of the heat exchanger.

Alternatively, the channel in the first member has a reduced dimension section adapted to locate the portion of the heat exchanger toward one end of the bracket, such that the reduced dimension section only allows displacement of the portion of the heat exchanger from one end of the channel to the other upon application of an impact force greater than or equal to the predetermined retaining force between the first and second members.

Alternatively, the channel in the first member has walls which are angled either in toward one another or away from one another, and the retaining lug comprises a corresponding shape, preferably on the heat exchanger, in order to provide an interference fit between the first and second members.

Preferably, the angled walls and retaining lug form a dovetail arrangement.

According to a second aspect of the present invention, there is provided a heat exchanger mounting bracket having a body member having a longitudinal slot toward one end for locating a portion of a heat exchanger and a pivotal arrangement toward the other end, wherein the pivotal arrangement and longitudinal slot allow displacement of the portion of the heat exchanger from a fore to an aft position upon application of an impact force.

Preferably, the portion of the heat exchanger comprises a mounting pin.

Preferably, the heat exchanger mounting bracket is provided with an end stop means which prevents the bracket from allowing displacement of the heat exchanger past the aft position. More preferably, the end stop means comprises a sprung arm co-operable with a pocket of the bracket. Typically, the co-operation between the sprung arm and pocket retains the bracket in the aft position when reached.

Preferably, the pivot arrangement comprises a bolt provided on a bracket of the vehicle which passes through an aperture provided on the heat exchanger bracket.

Typically, a resilient collar, such as a rubber collar, is provided in the longitudinal slot of the bracket.

Preferably, the pivotal arrangement further includes shear means which holds the bracket in the fore position prior to shearing and allows movement of the bracket from the fore to the aft position after shearing due to the impact force. Typically, the shear means is adapted to shear only when a predetermined impact force has been applied to the bracket. Preferably, the shear means comprises a shear pin having a shear strength determined by its material thickness and strength properties. Typically the shear pin comprises metallic material.

Further features and advantages of the invention will appear more clearly on a reading of the following detail description of the preferred embodiments of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Embodiments of the apparatus according to the present invention will now be described, with reference to the accompanying drawings, in which:—

Figure 1:
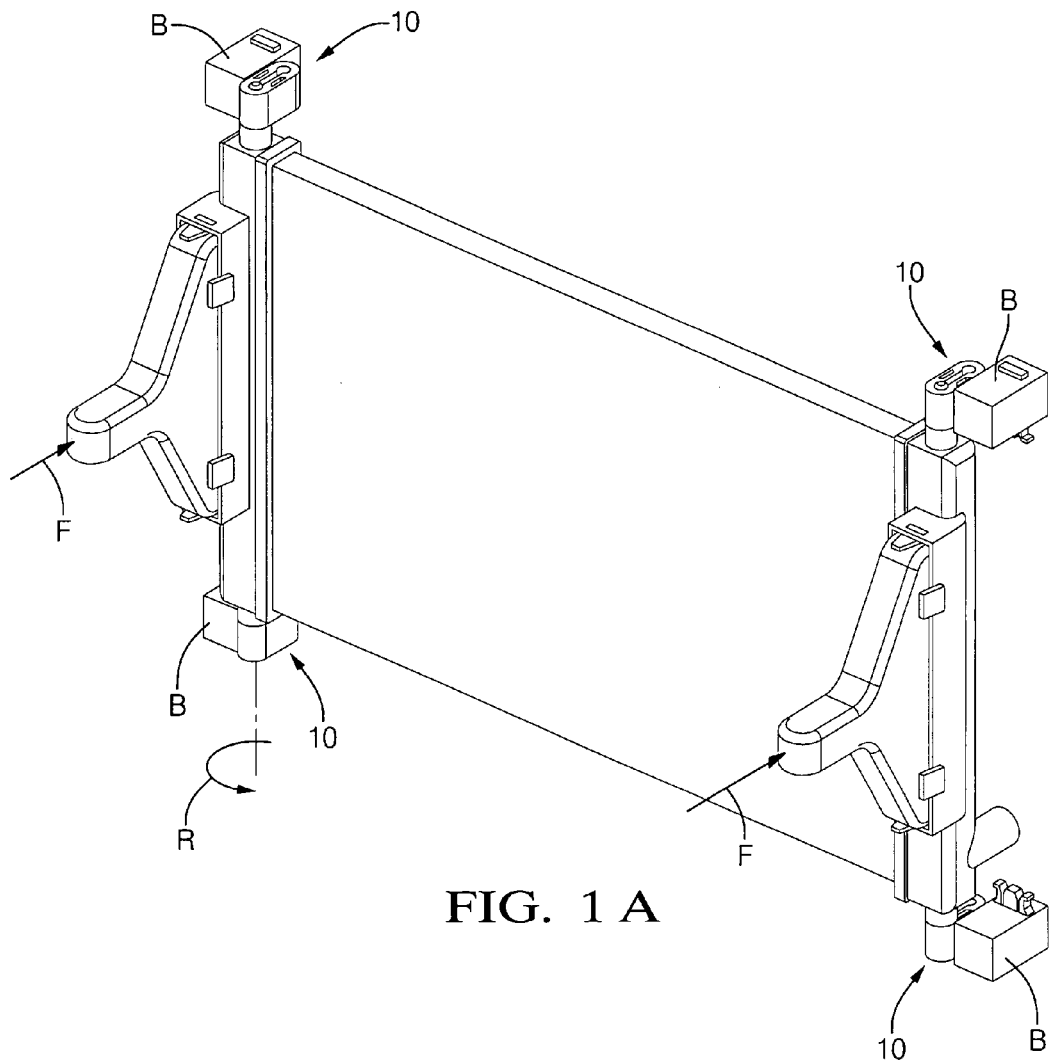
FIG. 1A is a perspective view of the front of a CRFM mounted in the engine compartment of a vehicle by mounting brackets according to a first aspect of a first embodiment the present invention.
FIG. 1B is a plan view of one side of the CRFM of FIG. 1A.
Figure 1:
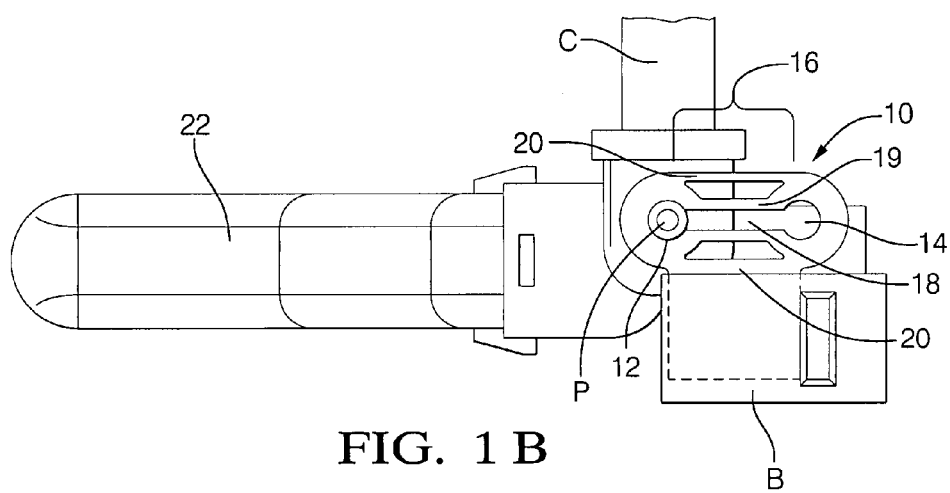

Referring to FIGS. 1A and 1B, in a first embodiment according to the first aspect of the present invention, heat exchanger mounting bracket 10 has a body provided with a first recess 12 (shown in FIG. 1B with a mounting pin (or retaining lug) P of the heat exchanger located therein) at one end and a second recess 14 at the other end. Between the recesses 12 and 14 is a displacement portion (slot) 16. The displacement portion 16 has a central retaining channel 18, resilient walls 19 on either side of the retaining channel 18 and outer rigid walls 20. One of the outer rigid walls 20 allows the bracket 10 to be secured to a bracket B of the vehicle structure. The bracket 10 is typically formed from a plastic material, although any other suitable material may be used.

The recesses 12 and 14 each have a diameter corresponding to that of a locating pin P on the CRFM (heat exchanger) C to be mounted. The central retaining channel 18 has a slightly narrower width than the diameter of the heat exchanger locating pin P.

Brackets 10 according to the present invention are provided on each corner of the heat exchanger C to allow it to be secured and supported at each corner by brackets B of the vehicle structure.

Spacer members 22 are provided on either end of the heat exchanger C to allow the impact force imparted on the front of the vehicle to be transferred to the heat exchanger C.

In normal use, prior to any impact, a mounting pin P of each corner of the heat exchanger C will reside in corresponding first recesses 12 of each bracket 10. The small width of the retaining channel 18 relative to the mounting pin diameter P prevents the pin P from slipping out of the recess 12. In the event of a frontal impact at one side of the vehicle, a portion of the vehicle body will deform in the first instance, which will reduce any clearance between the CRFM C and the front of the vehicle in a first phase. If the impact force is relatively small, no movement of the CRFM C will occur. However, if the impact force is larger, it will continue to exert a rearward force (represented by force arrow F) on the CRFM C in a second phase via spacer members 22. Such rearward force causes mounting pin P (on both the upper and lower portions of that side of the CRFM C) to move from the front recess 12 into the retaining channel 18 of the displacement portion 16. The resilient walls 19 of the displacement portion 16 flex outward under this force in order to accept the larger dimension of the pin P. The pin P will continue travelling from the first recess 12 to the second 14 as long as the impact force is maintained. In this regard, the deflection of the resilient walls 19 controls the rate of movement of the pin from the first to the second recess. Once the pin P reaches the other end of the displacement portion 16 it snaps into a retaining position within the second recess 14. The pin P is held in this position by the small dimension of the retaining channel 18 relative to the pin P diameter. This action allows that side of the CRFM C to move rearward without damage being caused thereto. This also absorbs a portion of the impact force imparted on an external object, such as a pedestrian. A typical length of the displacement portion 16 is around 40 mm in order to allow rearward displacement of the heat exchanger C by a corresponding amount, although this may be manipulated during manufacture of the bracket 10 depending upon the displacement required for specific vehicles.

In such an impact, the other side of the CRFM C is maintained in its forward position by the small diameter of the retaining channel 18 relative to the pin P since no rearward force is actually applied to the pin P of the CRFM C at that side. Rather, a rotational moment is provided as a result of the force F on the other side of the CRFM C which causes this side of the CRFM to simply pivot in the direction indicated by arrow R in FIG. 1A. In this regard, the circular first recess of the brackets 10 allow the circular pins P of the CRFM C to rotate with ease.

The above describes the operation of the brackets 10 in a front impact on one side of the vehicle; however, it will be understood that the system is also suitable for a full front impact which simultaneously exerts an impact force on both sides (left and right) of the heat exchanger C. In such a full front impact all pins P will move from the forward position (held by the first recess) to the rearward position (held by the second recess), thereby allowing the whole CRFM C to move rearward without twisting or being otherwise damaged.

Figure 2A:
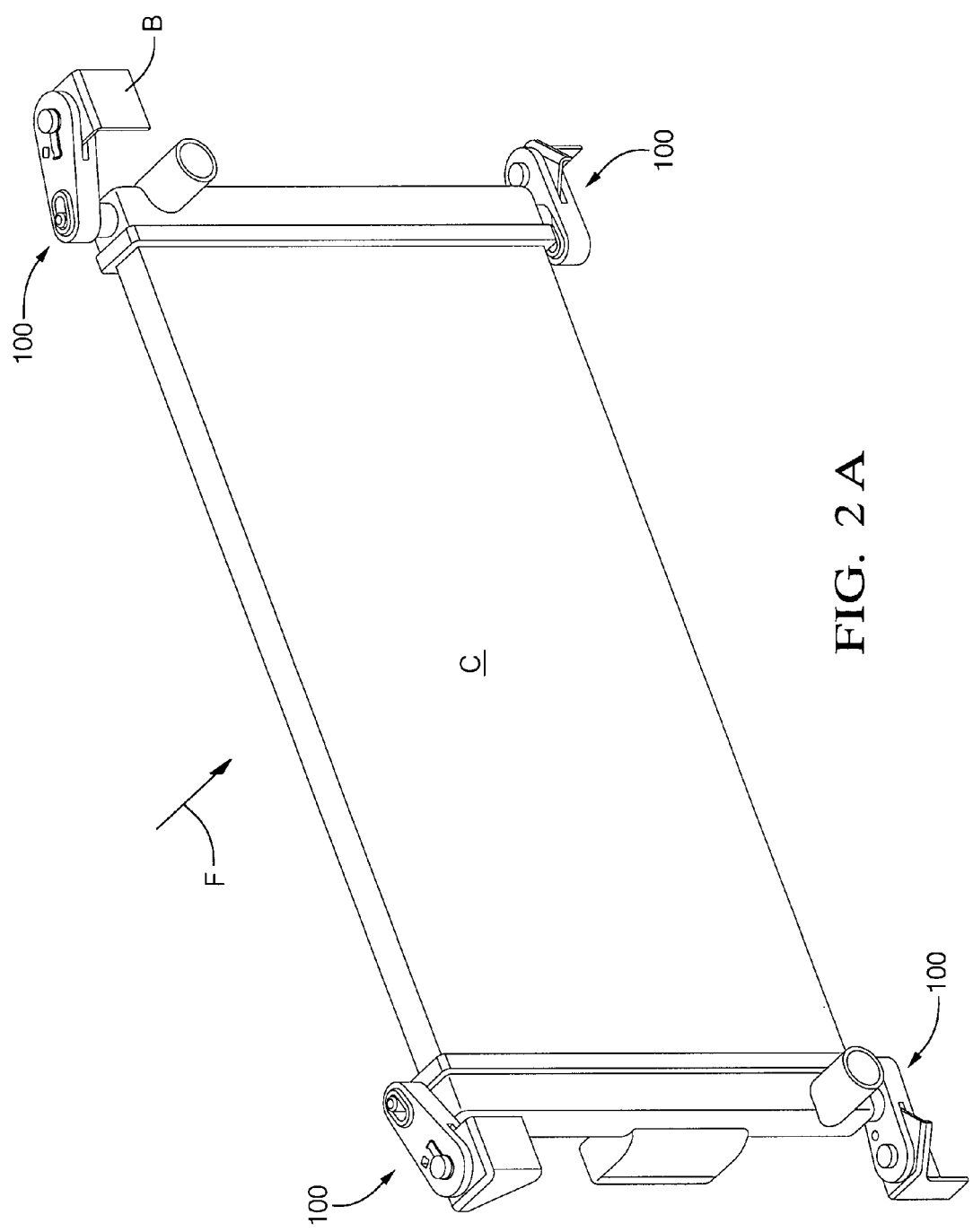
FIG. 2A is a perspective view of the rear of a CRFM mounted in the engine of a vehicle by mounting brackets according to a second aspect of the first embodiment of the present invention.
Figure 2:
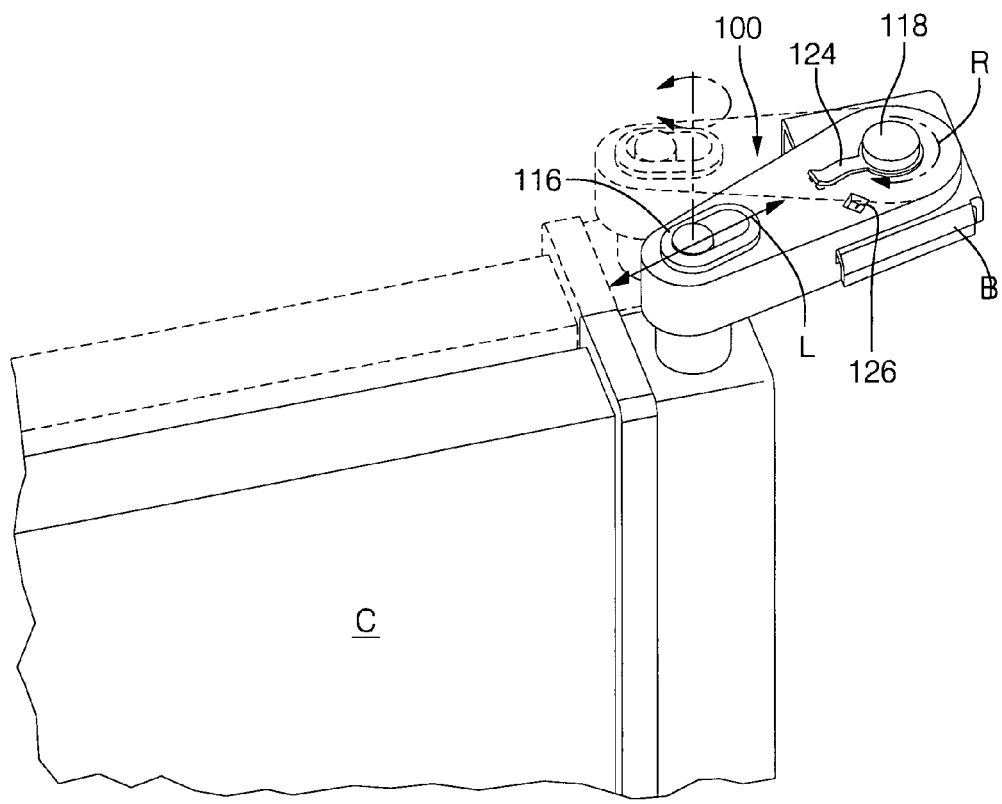
FIG. 2B is a more detailed view of one side of the CRFM of FIG. 2A where the CRFM has been moved rearward by an impact force.
FIG. 2C is a detailed view of the bracket of FIGS. 2A and 2B.
Figure 2:
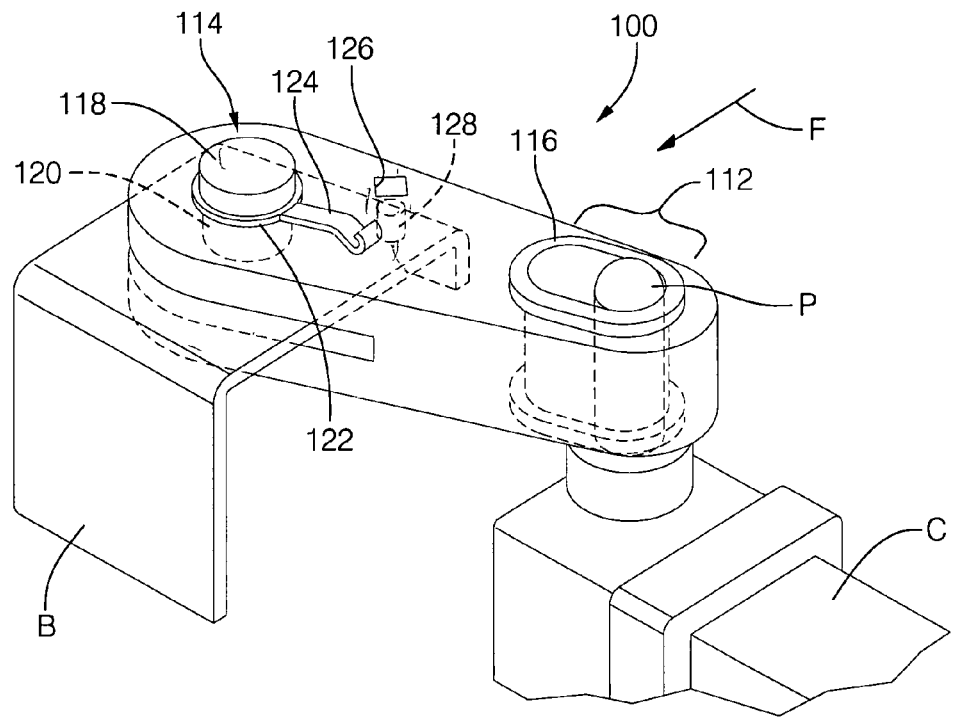

Referring to FIGS. 2A to 2C, in a second aspect of the present invention, a heat exchanger mounting bracket 100 comprises a slot 112 lined with a resilient collar 116 at one end and a pivot arrangement 114 at the other. The resilient collar is typically formed from rubber.

The pivot arrangement 114 comprises a bolt 118 which passes through an aperture (not shown) in the bracket 100 in order to allow connection of the heat exchanger mounting bracket 100 to a bracket B of the vehicle. This allows the bracket 100 to pivot around the bolt 118 in the event of an impact force (described subsequently). A metal insert 120 and washer 122 having a spring arm 124 extending therefrom are also provided around the bolt. The spring arm 124 interacts with a pocket 126 formed in the bracket 100 to form end-stop means as discussed subsequently. Shear means such as a shear pin 128 is also provided. The shear pin is formed of a suitable metal having a diameter which is calculated during manufacture of the bracket to shear when a given impact force is applied to the bracket.

In normal use, prior to any impact, a mounting pin P of each corner of the heat exchanger C will reside in corresponding slots 112 of each heat exchanger mounting bracket 100. In the event of a frontal impact at one side of the vehicle, a portion of the vehicle body will deform in the first instance, which will reduce any clearance between the CRFM C and the front of the vehicle in a first phase. If the impact force is relatively small, no movement of the CRFM C will occur. However, if the impact force is larger, it will continue to exert a rearward force (represented by force arrow F) on the CRFM C (spacer members (not shown) may be used). With reference to FIG. 2B, such rearward force causes mounting pin P (on both the upper and lower portions of that side of the CRFM C) to urge the bracket 100 rearward. At the outset of this, the resilient collar 116 will begin to be compressed. This will cause a shearing force to be exerted on the shear pin 128. Only once the shearing force exerted on the shear pin 128 has reached a critical level (calculated during manufacture of the bracket 100 and pin 128) will it shear. This allows a relatively gentle force to be applied to the bracket without moving it from the fore to the aft position. On continuation of the impact force past this point, the pin shear pin 128 will shear and the bracket 100 will pivot around bolt 118 in the direction referenced R. As the bracket is pivoting rearward, the pin P of the CRFM must slide along the slot 112, as indicated by arrow L in FIG. 2B) in order to maintain a constant distance between each mounting pin P on either side of the bracket thereby preventing the heat exchanger C from being twisted. When the CRFM reaches a rearmost position the sprung arm 124 of the washer 122 clicks into the pocket 126 of the bracket to prevent any further rotation of the bracket 100. This action allows that side of the CRFM C to move from a fore to an aft position without damage being caused thereto.

In such an impact, the other side of the CRFM C is maintained in its forward position by its corresponding bracket 100 since no rearward force is actually applied to the mounting pin P of the CRFM C at that side. Rather, a rotational moment is provided by the force F on the other side of the CRFM C which causes this side of the CRFM to simply pivot without moving the heat exchanger mounting bracket 100 from its fore to rear position.

The above describes the operation of the brackets 100 in a front impact on one side of the vehicle; however, it will be understood that the system is also suitable for a full front impact which simultaneously exerts an impact force on both sides (left and right) of the heat exchanger C. In such a full front impact all shear pins will shear (if the impact is severe enough) and all pins P will move from the forward position to the rearward position and will be held in this position by the interaction between the sprung arm 124 and the pocket 126 of each bracket 100. This allows the whole CRFM C to move rearward without twisting or being otherwise damaged.

Figure 3:
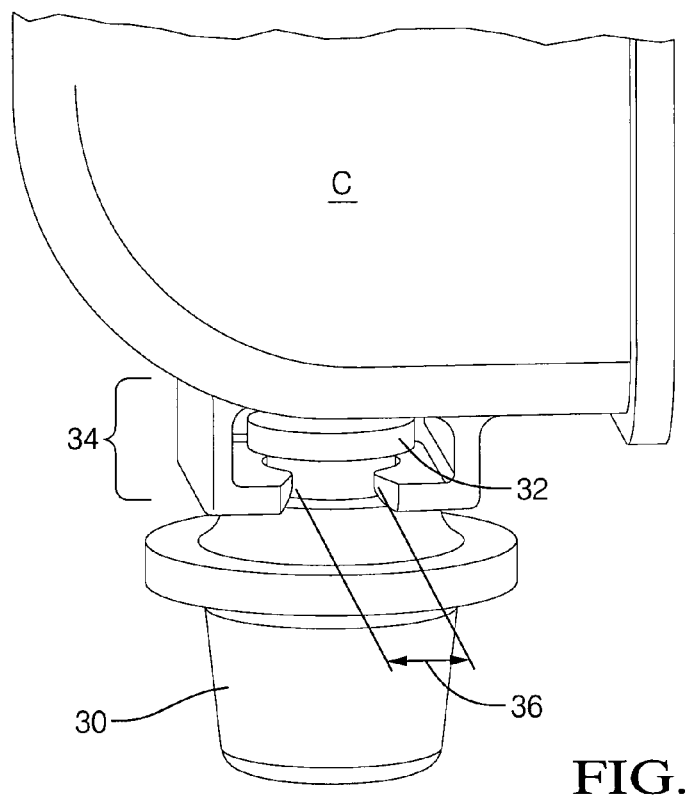
FIG. 3 is a perspective view of a corner of a CRFM mounted by mounting brackets according to a first aspect of a second embodiment of the present invention.

Referring to FIG. 3, a second embodiment of the invention according to the first aspect of the present invention will now be described. In this embodiment, a commonly available rubber vibration isolator 30 has been provided with a head which forms a retaining lug 32. The bottom of the CRFM C is provided with a bracket formation 34 which has a channel with a narrowed neck portion 36.

During manufacture, the CRFM is brought toward the vibration isolator 30. The bracket formation 34 is aligned with the retaining lug 32 and is pushed thereagainst. As the bracket formation 34 is pushed against the retaining lug 32 it snaps past the narrowed neck portion 36 and into engagement therewith. In a collision event, where the magnitude of the forces involved are large enough, the retaining lug 32 will snap out of engagement with the bracket formation 34, thereby allowing the CRFM and vibration isolator/mounting to move relative to one another.

This arrangement has a number of benefits, including the following:—
The number of components required to mount the CRFM in the required fashion is minimised since no separate pin is required;
The arrangement provides combined mounting and isolation of the CRFM from vibration forces;
No threads are required on the CRFM which reduces the cost and complexity of production;
No permanent damage occurs to either the retaining lug 32 or the bracket formation 34 when release occurs; hence the bracket is easily re-used;
A relatively standard isolator design may be used with minimal modification.

Figure 4:
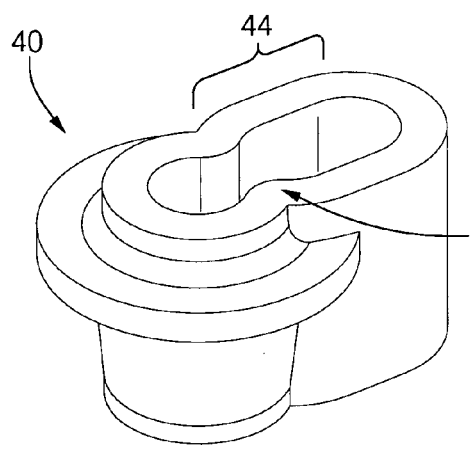
FIG. 4A is an upper perspective view of a mounting bracket according to a third embodiment the first aspect of the present invention.
FIG. 4B is a lower perspective view of the mounting bracket of FIG. 4A.
Figure 4:
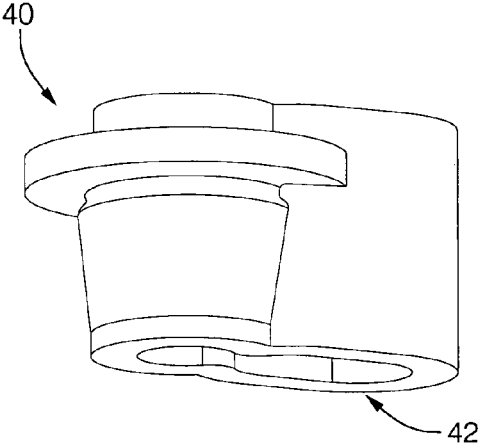

Referring to FIGS. 4A and 4B, a third embodiment of the invention according to the first aspect of the present invention will now be described. This embodiment is similar to the first embodiment of the invention (FIGS. 1A and 1B) except that the body member 40 has only a single reduced dimension section 42 in the otherwise uniform retaining channel 44. The body member 40 is also formed of a suitable material in order to provide a vibration isolator (which may be tuned depending upon the application).

During manufacture a retaining lug (pin) of the CRFM is inserted into one end of the retaining channel 44 and is held in position by the reduced dimension section 42. In a collision event, where the magnitude of the forces involved are large enough, the retaining lug of the CRFM will snap past the reduced dimension section 42 and will travel toward the opposite end of the retaining channel 44, thereby allowing the CRFM and vibration isolator/mounting to move relative to one another. This controls the direction of movement of the CRFM in order to protect under hood components of the automobile and allow better predictability in the absorption of impact forces to, for example, a pedestrian.

Figure 5:
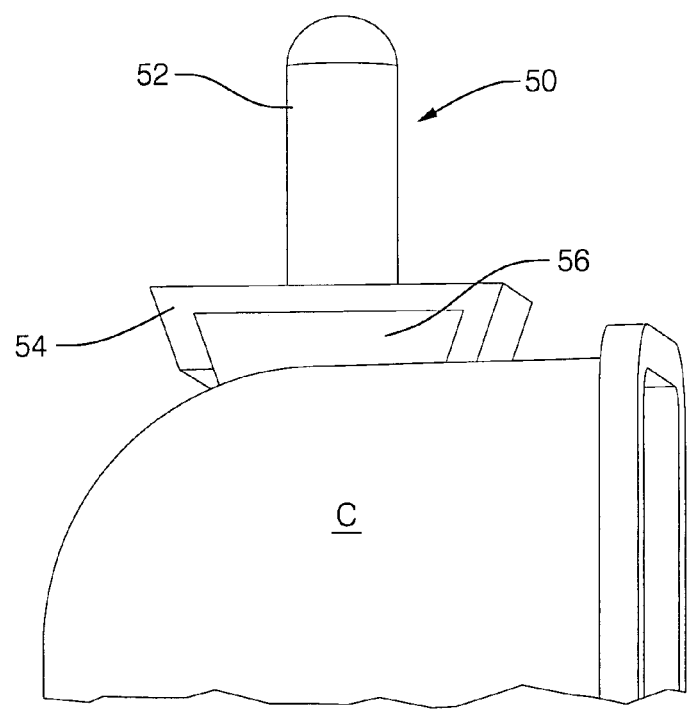
FIG. 5A is a perspective view of a corner of a CRFM mounted by mounting brackets according to a fourth embodiment of the present invention.
FIG. 5B is a transverse view of the CRFM mounting brackets of FIG. 5A.
Figure 5:
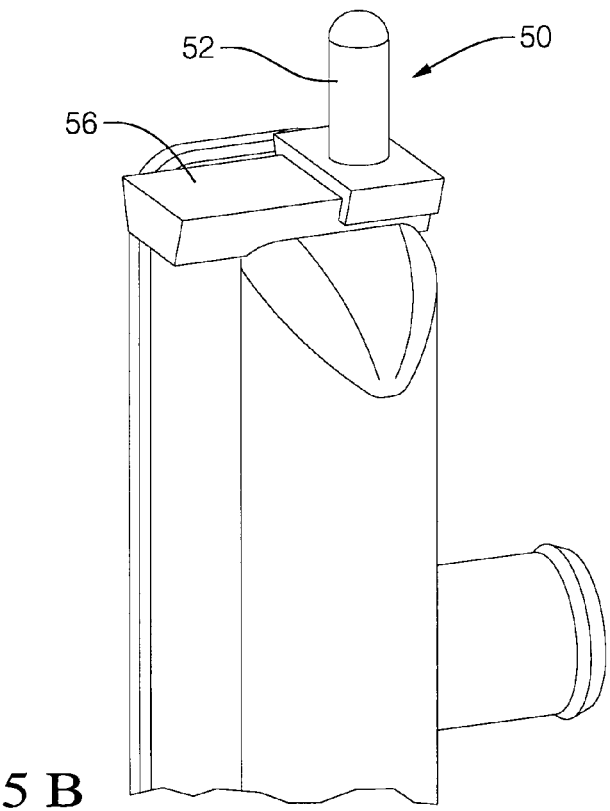

Referring to FIGS. 5A and 5B, a fourth embodiment of the invention according to the first aspect of the present invention will now be described. In this embodiment the first body member 50 has a mounting pin 52 and dovetailed socket (or retaining channel) 54. A corresponding dovetailed tongue (or retaining lug) 56 is provided on the top of the CRFM C. The relative sizes of the outer surface of the tongue 56 and the inner surfaces of the socket 54 are designed to provide a tight fit therebetween.

During manufacture, the tongue 56 is slid into the socket 54. The similarity in sizes between the socket 54 and tongue 56 provides a close fitting connection between the first and second members which is capable of securing the CRFM C during normal operations. In a collision event, where the magnitude of the forces involved are large enough, tongue 56 will begin to slide along the socket 54 of the first body member 50. This allows the CRFM to move relative to the first member thereby absorbing the impact forces. Whilst sliding along the socket 54, the direction of movement of the CRFM is controlled. Furthermore, the level of friction between the tongue 56 and socket 54 can be manipulated during manufacture (by tightening or loosening the grip of the socket 54 on the tongue 56) in order to control the rate at which the tongue 56 will slide along the channel 54 in a given impact situation.

Each of the above described arrangements avoid the CRFM being twisted and/or crushed during a medium magnitude impact whilst ensuring that it remains adequately supported after the impact. With such an arrangement, a vehicle involved in a medium magnitude impact may be driven immediately after the impact without requiring any servicing. This allows it to be driven to the nearest garage for example.

Another advantage of the described heat exchanger mounting brackets is that they may be re-used after an impact since none of the parts are damaged by the displacement process other than the shear pins which are readily replaceable.

Furthermore, these arrangements also allow a portion of the impact force to be absorbed by controlled deformation/displacement of heat exchanger components in order to minimise any damage to the object with which the collision occurs, for example a pedestrian.

Modifications and improvements may be made to the foregoing without departing from the scope of the invention. While this invention has been described in terms of the preferred embodiments thereof, it is not intended to be so limited, but rather only to the extent set forth in the claims that follow.

We claim:

1. A heat exchanger mounting bracket in a vehicle, comprising:
   a body member having a longitudinal slot toward one end for locating a portion of a heat exchanger and a pocket, and a pivotal arrangement toward the other end,
   wherein the pivotal arrangement and longitudinal slot allow displacement of the portion of the heat exchanger from a fore to an aft position upon application of an impact force,
   wherein the pivotal arrangement further comprises a bolt about which the pivotal arrangement rotates, shear means which holds the bracket in the fore position prior to shearing and allows movement of the bracket from the fore to the aft position after shearing due to the impact force, and a spring arm extending from the bolt, in which the spring arm includes a distal end having means to click into the pocket of the body member to prevent the bracket from allowing displacement of the heat exchanger past the aft position.

2. A heat exchanger mounting bracket according to claim 1, wherein the shear means is adapted to shear only when a pre-determined impact force has been applied to the bracket.

3. A heat exchanger mounting bracket according to claim 2, wherein the shear means comprises a shear pin having a shear strength determined by its material thickness and strength properties.

4. A heat exchanger mounting bracket according to claim 1, wherein the spring arm is rotationally fixed to the bolt such that the pivot arrangement is rotatable about the bolt to position the pocket to engage the distal end of the spring arm.

* * * * *